(12) United States Patent  
Ehlers

(10) Patent No.: US 7,770,929 B2
(45) Date of Patent: Aug. 10, 2010

(54) VEHICULAR SEATBELT RESTRAINT WITH SELECTIVELY DISABLED INERTIA REEL ASSEMBLY

(75) Inventor: Benjamin J. Ehlers, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/107,515

(22) Filed: Apr. 22, 2008

(65) Prior Publication Data

US 2009/0261568 A1    Oct. 22, 2009

(51) Int. Cl.
B60R 22/46 (2006.01)

(52) U.S. Cl. .................. 280/806; 280/807; 242/374; 242/390.1; 701/45

(58) Field of Classification Search .................. 280/806, 280/807; 242/374, 390.1, 390.8, 390.9; 701/45
See application file for complete search history.

(56) References Cited

U.S. PATENT DOCUMENTS

| | | | |
|---|---|---|---|
| 2,953,315 A | 9/1960 | Lautier et al. | |
| 3,632,056 A | 1/1972 | Hibbard et al. | |
| 3,666,198 A | 5/1972 | Neumann | |
| 4,244,600 A | 1/1981 | Takada | |
| 4,747,616 A | 5/1988 | Burris | |
| 4,849,733 A | 7/1989 | Conigliaro et al. | |
| 5,438,311 A | 8/1995 | Lane, Sr. | |
| 5,660,346 A * | 8/1997 | Dick | 242/376.1 |
| 5,672,916 A | 9/1997 | Mattes et al. | |
| 5,704,099 A | 1/1998 | Cahill | |
| 5,794,878 A | 8/1998 | Carpenter et al. | |
| 5,826,936 A | 10/1998 | Scordato et al. | |
| 5,871,063 A | 2/1999 | Young | |
| 5,960,523 A | 10/1999 | Husby et al. | |
| 6,079,744 A | 6/2000 | Husby et al. | |
| 6,213,512 B1 * | 4/2001 | Swann et al. | 280/806 |
| 6,427,935 B1 * | 8/2002 | Fujii et al. | 242/390.9 |
| 6,827,308 B2 * | 12/2004 | Fujii et al. | 242/390.9 |
| 7,011,338 B2 * | 3/2006 | Midorikawa et al. | 280/735 |
| 7,036,849 B2 | 5/2006 | Drinkrow | |
| 7,286,825 B2 | 10/2007 | Shishido et al. | |
| 7,416,149 B2 * | 8/2008 | Koide et al. | 242/374 |
| 7,506,832 B2 * | 3/2009 | Mori | 242/374 |
| 2002/0158162 A1 * | 10/2002 | Fujii et al. | 242/390.9 |
| 2002/0166916 A1 * | 11/2002 | Fujii et al. | 242/390.9 |

* cited by examiner

*Primary Examiner*—Toan C To

(57) ABSTRACT

A locking mechanism of an inertia reel assembly of a vehicular seatbelt restraint system is selectively disabled based on a latch status of a seatbelt buckle of the seatbelt restraint system. In one embodiment, a sensor at a latch assembly determines whether the seatbelt buckle is engaged with the latch assembly and provides an output signal based on this determination. A controller receives the output signal and selectively drives an actuator based on the output signal so as to enable or disable the locking mechanism of the inertia reel assembly. By disabling the locking mechanism of the inertia reel assembly when the seatbelt buckle is detected as unlatched, an occupant is able to quickly latch the seatbelt buckle even in the event of an inertial event that otherwise would have prevented any further extension of the seatbelt.

16 Claims, 4 Drawing Sheets

VEHICULAR SEATBELT RESTRAINT WITH SELECTIVELY DISABLED INERTIA REEL ASSEMBLY

FIELD OF THE DISCLOSURE

The present disclosure relates generally to vehicular seatbelt restraint systems and more particularly to inertia reel assemblies for vehicular seatbelt restraint systems.

BACKGROUND

Vehicular seatbelt restraint systems often make use of an inertia reel assembly that locks to prevent additional seatbelt webbing from being fed out in response to an abrupt pull on the seatbelt webbing or in response to the acceleration of a pendulum mechanism (e.g., when the vehicle is decelerating rapidly). This prevention of the extension of the seatbelt typically can help to reduce the likelihood of injury to the occupant. However, an occupant may have temporarily unlatched the seatbelt or not yet have latched the seatbelt while the vehicle is in motion. In certain instances, such as when the vehicle is making a sharp turn or rapidly decelerating or the occupant is pulling on the seatbelt quickly in an attempt to latch the seatbelt, the locking mechanism of the inertia reel assembly can be engaged, thereby preventing the occupant from latching the seatbelt until the inertia event falls below the locking threshold or once tension no longer is being applied to the seatbelt webbing. There is then the possibility that the vehicle could be involved in an accident while the seatbelt is not properly latched, placing the occupant at risk of grave injury. In fact, it could be the occupant's panicked anticipation of an impending accident that causes the occupant to give a rapid jerk on the seatbelt, thereby engaging the locking mechanism of the inertia reel assembly and preventing the occupant from latching the seatbelt. Accordingly, a technique for selectively disengaging the locking mechanism of an inertia reel assembly of a vehicular restraint system would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate example techniques for selectively disabling a locking mechanism of an inertia reel assembly of a vehicular seatbelt restraint system based on a latch status of a seatbelt of the seatbelt restraint system. In one embodiment, a sensor at a latch assembly determines whether a seatbelt buckle is engaged with the latch assembly and provides an output signal based on this determination. A controller receives the output signal and selectively drives an actuator based on the output signal so as to enable or disable the locking mechanism of the inertia reel mechanism. By disabling the locking mechanism of the inertia reel mechanism when the seatbelt buckle is detected as unlatched, an occupant is able to quickly latch the seatbelt buckle even in the event of an inertial event that otherwise would have prevented any further extension of the seatbelt.

Figure 1:
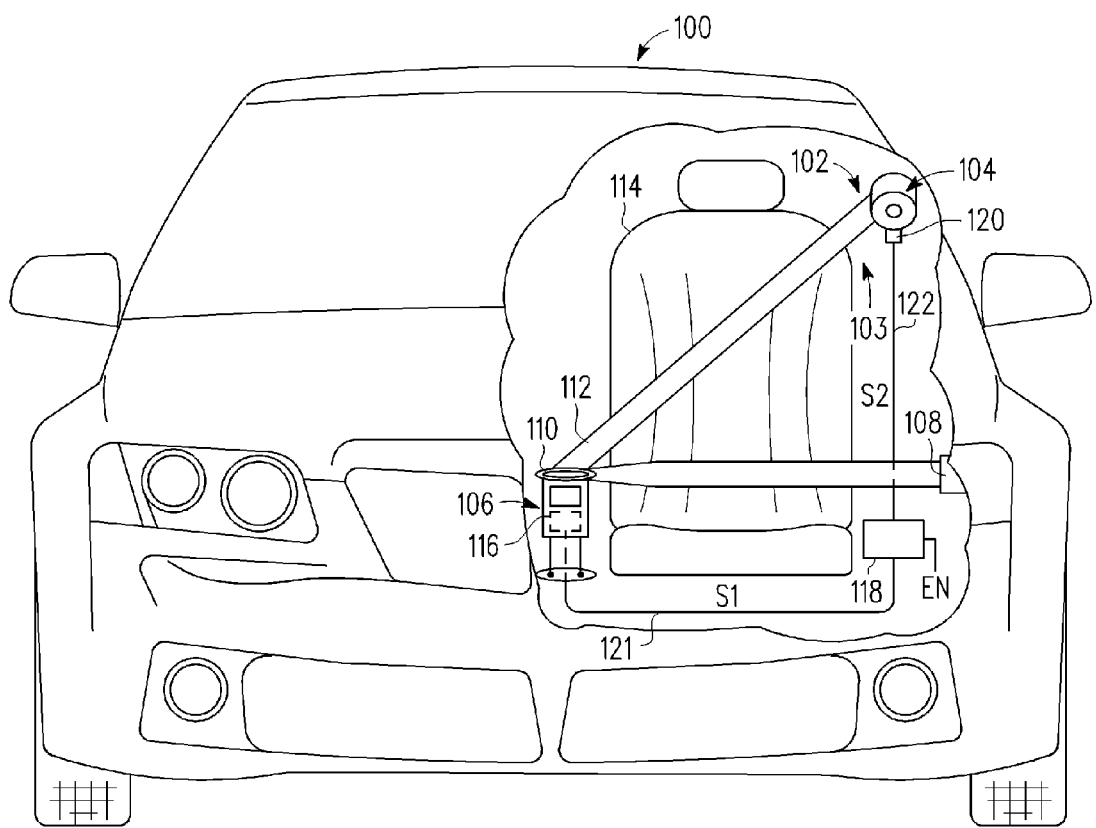
FIG. 1 is a diagram illustrating a vehicle with a seatbelt restraint system having an inertia reel assembly with a selectively disabled locking mechanism based on a latch status of a seatbelt in accordance with at least one embodiment of the present disclosure.

FIG. 1 illustrates a vehicle 100 having a restraint system 102 mounted thereto in accordance with at least one embodiment of the present disclosure. The vehicle 100 can include any of a variety of vehicles, such as an automobile, a tractor trailer, a bus, a train, a tractor, an airplane, a boat, etc. The restraint system 102 includes a seatbelt assembly 103 having an inertia reel assembly 104, a latch assembly 106, and an anchor 108 each mounted to the body of the vehicle 100. Although the inertia reel assembly 104 is illustrated in a particular mounting position on a pillar of the vehicle body, it will be appreciated that the particular arrangement of the inertia reel assembly 104, the latch assembly 106, and the anchor 108 may vary from vehicle to vehicle without departing from the scope of the present disclosure. The seatbelt assembly 103 further includes a seatbelt buckle 110 and seatbelt webbing 112, whereby the seatbelt webbing 112 is wound around a seatbelt reel (not shown) of the inertia reel assembly 104, connected to the anchor 108, and constrained by the seatbelt buckle 108 so as to form a three-point restraint for an occupant in the seat 114. In other embodiments, the restraint system 102 can include a four-point restraint, a five-point restraint, etc.

As is described in greater detail below, the inertia reel assembly 104 includes the seatbelt reel and a locking mechanism having an unlocked configuration and a lockable configuration. When in the unlocked configuration, the locking mechanism of the inertia reel assembly 104 is disabled, thereby permitting the seatbelt reel to rotate in two directions (clockwise and counterclockwise) to as to feed out or take in the seatbelt webbing 112, respectively, regardless of any inertial event (e.g., rapid deceleration of the vehicle 100 or an abrupt pull on the seatbelt webbing 112) at the inertia reel assembly 104. Thus, an occupant can continue to feed out seatbelt webbing 112 so as to engage the seatbelt buckle 110 with the latch assembly 106 even under rapid deceleration, hard cornering, or when the occupant rapidly jerks on the seatbelt webbing 112. When in the lockable configuration, the locking mechanism is enabled and therefore can be engaged in response to an inertial event, thereby permitting the seatbelt reel to rotate in only one direction so as to prevent additional seatbelt webbing from being fed out. If the locking mechanism is not engaged when in the lockable configuration, the seatbelt reel is permitted to rotate in both directions, thereby allowing the seatbelt webbing 112 to be fed out from the seatbelt reel in the absence of an inertial event. Example implementations of the inertia reel assembly 104 and various example means for manipulating the inertia reel assembly 104 into the unlocked are illustrated in greater detail below with reference to FIGS. 3-7.

The restraint system 102 further includes a sensor 116, a controller 118, and an actuator 120. The sensor 116 is disposed at or proximal to the latch assembly 106 and is configured to sense whether the seatbelt buckle 110 is engaged with the latch assembly 106 (i.e., determine the "latch state" of the seatbelt buckle 110) and to provide an output signal 121 having one of two states based on the latch state of the seatbelt buckle 110. The sensor 116 can include, for example, a conductive path-type sensor whereby the insertion of a metal component of the seatbelt buckle 110 into the latch assembly 106 closes a conductive path, which is sensed by the sensor 116. The sensor 116 alternately can include a pressure-type sensor that is triggered when the seatbelt buckle 110 is inserted into the latch assembly 106, a capacitive-type sensor that senses a change in capacitance due to the introduction of the seatbelt buckle 110 into the latch assembly 106, an optical sensor that detects the presence of the seatbelt buckle 110 in the latch assembly 106 based on the blockage of light emitted from a light-emitting diode (LED) or other light source, etc. Non-limiting example implementations of the sensor 116 can be found in U.S. Pat. Nos. 4,747,616; 4,849,733; 5,672,916; 5,960,523; 6,079,744; and 7,296,825.

The controller 118 includes an input to receive the signal 121 output by the sensor 116 and an output to provide a signal 122 to the actuator 120 so as to manipulate the actuator 120 based on the state of the signal 121 via the signal 122. In one embodiment, the controller drives the signal 122 to either a first state (e.g., logic 1, X volts, digital value A) or a second state (e.g., logic 0, Y volts, digital value B) (or vice versa) based on whether the state of the signal 121 indicates the seatbelt buckle 110 is latched as illustrated by the relationship:

IF SIGNAL 121=LATCHED THEN SIGNAL 121=FIRST STATE
IF SIGNAL 121=UNLATCHED THEN SIGNAL 121=SECOND STATE

The controller 118 can be implemented in any of a variety of manners. In one embodiment, the controller 118 is implemented as part of an electronic control unit (ECU) of the vehicle 100, whereby the functions of the controller 118 can be implemented as instructions stored in a memory of the ECU and executed by processing unit of the ECU so as to achieve the described functions. Alternately, the controller 118 can be implemented as hardware logic or a hardware state machine of the ECU (or as a separate component) that is configured to achieve the above-described relationship between the signal 121 and the signal 122. In yet another embodiment, the controller 118 can be implemented as an amplifier or signal driver that amplifies the signal 121 to generate the signal 122 so as to source sufficient power to the actuator 120 via the signal 122 so as to drive the actuator 120 in the intended manner. Alternately, the signal 122 can be used to control a power switch (e.g., a power transistor) that sources sufficient power to the actuator 120 when enabled to drive the actuator 120 in the intended manner. Further, in one embodiment, the restraint system 102 can be implemented without the controller 118, whereby the signal 121 output by the sensor 116 serves as the signal 122 input to the actuator 120.

The actuator 120 is configured to manipulate the inertia reel assembly 104 so as to place the inertia reel assembly 104 in the unlocked configuration or otherwise disable the locking mechanism of the inertia reel assembly 104 when the signal 122 is in the second state (i.e., when the seatbelt buckle 110 is disengaged from the latch assembly 106). Conversely, the actuator 120 is configured to place the inertia reel assembly 104 in the lockable configuration or otherwise enable the locking mechanism of the inertia reel assembly 104 when the signal 122 is in the first state (i.e., when the seatbelt buckle 110 is engaged with the latch assembly 106). Thus, the actuator 120 enables or disables the locking mechanism of the inertia reel assembly 104 based on the latch state of the seatbelt buckle 110. Accordingly, in this configuration, an occupant will remain able to feed out sufficient seatbelt webbing 112 to engage the seatbelt buckle 110 with the latch assembly 106 even when an inertial event, such as vehicle deceleration or an abrupt jerk on the seatbelt webbing 112, is present, while allowing the inertia reel mechanism 104 to lock in response to an inertial event when the seatbelt buckle 110 is engaged with the latch assembly 106.

Figure 2:
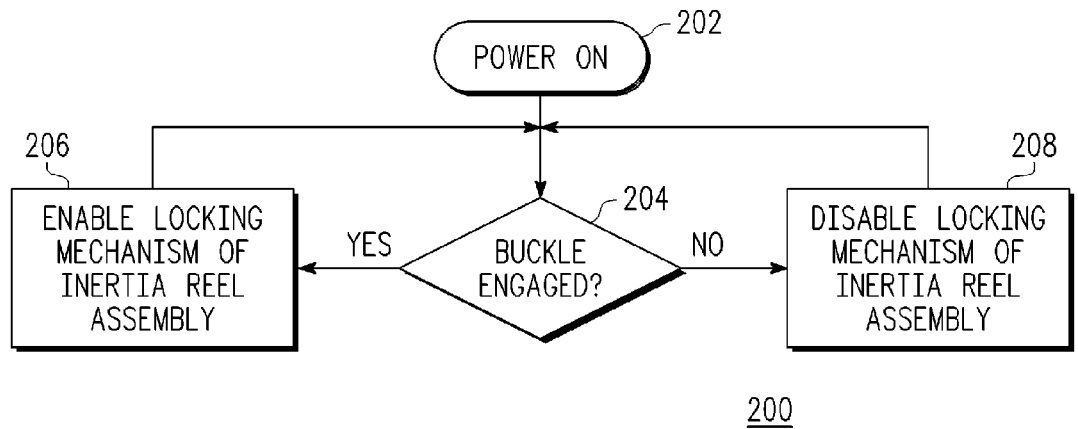
FIG. 2 is a flow diagram illustrating an example method for selectively disabling a locking mechanism of the inertia reel assembly of the vehicular seatbelt restraint system of FIG. 1 based on the latch status of the seatbelt in accordance with at least one embodiment of the present disclosure.

FIG. 2 illustrates a method 200 of operation of the restraint system 102 of the vehicle 100 of FIG. 1 in accordance with at least one embodiment of the present disclosure. At block 202, the vehicle 100 is powered on, thereby powering on the electronic components of the vehicle 100, including the sensor 116 and the controller 118. At block 204, controller 118 determines whether the seatbelt buckle 110 is engaged with the latch assembly 106 based on the state of the signal 121 output by the sensor 116. In the event that the seatbelt buckle 110 is engaged, at block 204 the controller 118 configures the signal 122 to the first state, which in turn manipulates the actuator 120 so as to configure the inertia reel assembly 104 into the lockable state by enabling the locking mechanism of the inertia reel assembly 104. Otherwise, if the seatbelt buckle 110 is disengaged from the latch assembly 106, the controller 118 configures the signal 122 to the second state, which in turn manipulates the actuator 120 so as to configure the inertia reel assembly 104 into the unlocked state by disabling the locking mechanism of the inertia reel assembly 104. In either case, the flow of method 200 returns to block 204 whereby the controller 118 monitors for a change in the latch state of the seatbelt buckle 110 via the sensor 116 and proceeds again to either block 204 or 206 accordingly.

Figure 3:
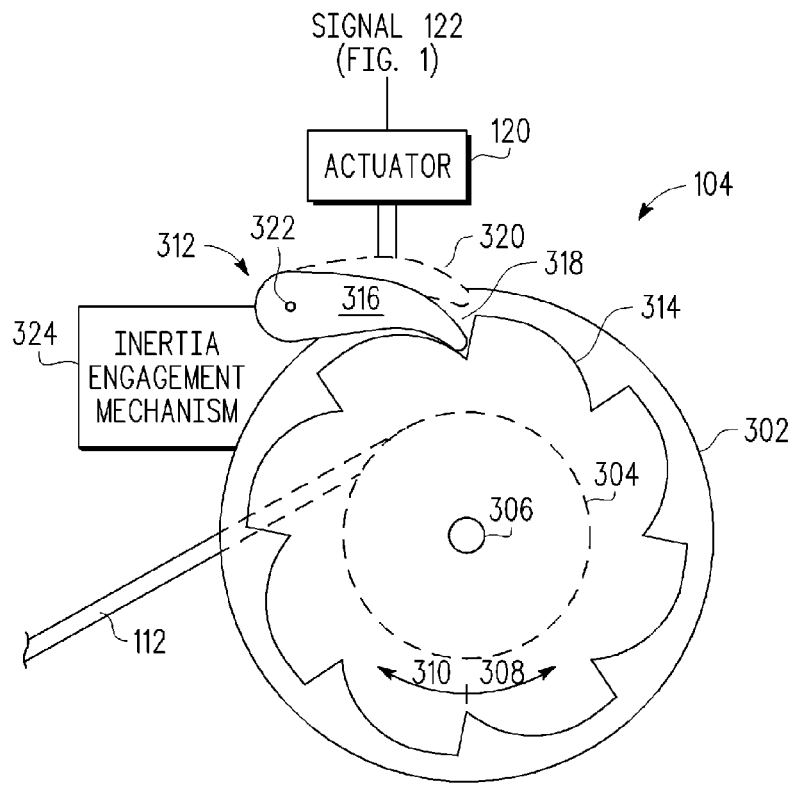
FIG. 3 is a diagram illustrating a side view of a locking mechanism of the inertia reel assembly of the seatbelt restraint system of FIG. 1 and an actuator for manipulating the locking mechanism in accordance with at least one embodiment of the present disclosure.

FIG. 3 illustrates an example implementation of the actuator 120 and the inertia reel assembly 104 in accordance with at least one embodiment of the present disclosure. In the depicted example, the inertia reel assembly 104 includes a seatbelt reel 302 having a drum 304 around which the seatbelt webbing 112 is wound. The drum 304 can be rotated around an axel 206 in either direction 308 (to feed out seatbelt webbing 112) or direction 310 (to draw in seatbelt webbing 112).

The inertia reel assembly 104 further includes a locking mechanism 312. The locking mechanism 312, in one embodiment, includes a ratchet wheel 314 affixed to the seatbelt reel 302 and a pawl 314 that can be maneuvered into either an engaged position 318 or a disengaged position 320 (e.g., via rotation about an axel 322 or by shifting the entire pawl 314 toward or away from the teeth of the ratchet wheel 314). Alternately, the ratchet wheel 314 can be moved toward or away from the pawl 314 via a cam or other mechanism so as to achieve the engaged position 318 or the disengaged position 320, respectively. While in the disengaged position 320, the pawl 316 permits the ratchet wheel 314, and thus the seatbelt reel 302, to rotate in either direction 308 or direction 310. However, while in the engaged position 318, the pawl 312 permits the ratchet wheel 314 to rotate in the direction 310 but prevents rotation of the ratchet wheel 314 in the direction 308, and thus prevents the seatbelt reel 302 from rotating in the direction 308 so as to allow more seatbelt webbing 112 to be fed out. Although illustrated as a lever-type implementation, the pawl 316 can be implemented in other forms, such as a lock bar or another ratchet wheel oriented in an opposite direction, without departing from the scope of the disclosure. The locking mechanism 312 further includes an inertial engagement mechanism 324 to manipulate the pawl 316 into the engaged position 318 in response to an inertial event such as an abrupt pull on the seatbelt webbing 112 or the deceleration or cornering of the vehicle 110. The inertial engagement mechanism 324 can include any of a variety of inertial engagement mechanisms known in the art, non-limiting examples of which are described in U.S. Pat. Nos. 2,953, 315; 3,632,056; 3,666,198; 4,244,600, and 5,794,878.

Although FIG. 3 illustrates an example implementation of the locking mechanism 312 as a pawl and ratchet wheel, other locking mechanisms for preventing feed out of seatbelt webbing 112 can be implemented without departing from the scope of the present disclosure. For example, a clamp-type locking mechanism, such as the one described in U.S. Pat. No. 7,036,849, can be implemented as the locking mechanism 312 of the inertia reel assembly 104.

As described above, the actuator 120 is configured to manipulate the locking mechanism 312 so as to disable the locking mechanism 312 in response to the signal 122 indicating the seatbelt buckle 310 is latched and to enable the locking mechanism 312 in response to the signal 122 indicating the seatbelt buckle 310 is unlatched. In the example implementation of FIG. 3, the actuator 120 disables the locking mechanism 312 by positioning the pawl 316 into disengaged position 320 and preventing its repositioning into the engaged position 318 by the inertial engagement mechanism 324. Further, the actuator 120 enables the locking mechanism 312 by manipulating the locking mechanism 312 to permit the pawl 316 to be freely moved between the engaged position 318 and the disengaged position 320 by the inertial engagement mechanism 324 based on the inertial state of the inertia reel assembly 104.

Figure 4:
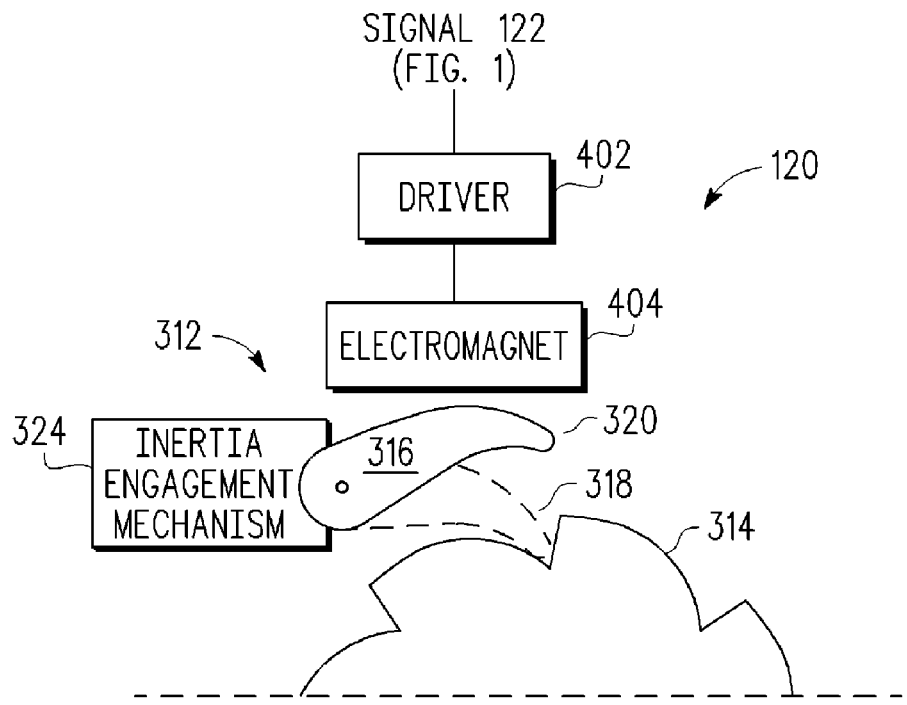
FIG. 4 is a diagram illustrating an example implementation of the actuator and the locking mechanism of the inertia reel assembly of FIG. 3 in accordance with at least one embodiment of the present disclosure.

FIG. 4 illustrates an example implementation of the actuator 120 with respect to the example locking mechanism 312 of FIG. 3 in accordance with at least one embodiment of the present disclosure. In the depicted example, the pawl 316 is fabricated with ferrous metal or includes a ferrous metal component and the actuator 120 is implemented as a driver 120 and an electromagnet 204. When the signal 122 indicates the seatbelt buckle 110 is unlatched, the driver 402 energizes the electromagnet 404, which magnetically draws the pawl 316 into the disengaged position 320 and maintains the pawl 316 in the disengaged position 320 while energized, thus preventing the pawl 316 from engaging the teeth of the ratchet wheel 314. In at least one embodiment, the force of the electromagnet 304 on the pawl 316 is greater than the force exertable by the inertial engagement mechanism 324 so that the actuator 120 can override the inertial engagement mechanism 324 during an inertial event. When the signal 122 indicates the seatbelt is latched, the driver 402 ceases energizing the electromagnet 404, thereby permitting the inertial engagement mechanism 324 to move the pawl 316 freely between the engaged position 318 and the disengaged position 320 responsive to the inertial state of the inertia reel assembly 104.

Figure 5:
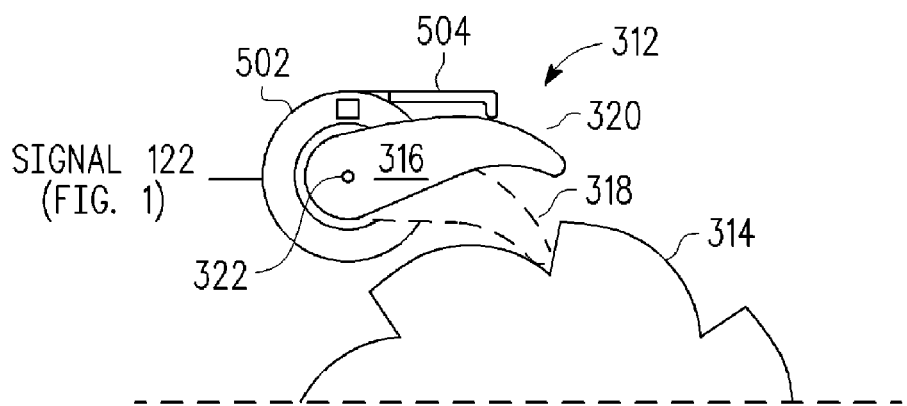
FIG. 5 is a diagram illustrating another example implementation of the actuator and the locking mechanism of the inertia reel assembly of FIG. 3 in accordance with at least one embodiment of the present disclosure.

FIG. 5 illustrates another example implementation of the actuator 120 with respect to the example locking mechanism 312 of FIG. 3 in accordance with at least one embodiment of the present disclosure. In the depicted example, the actuator 120 is implemented as an electric motor 502 having a rotor connected to the pawl 316 (e.g., directly to the axel 322 of the pawl 316, via one or more gears, etc.). When the signal 122 indicates the seatbelt buckle 110 is unlatched, the rotor of the electric motor 502 rotates so as to move the pawl 316 into the disengaged position 320 and maintain the pawl 316 in the disengaged position 320 so as to prevent the pawl 316 from engaging the teeth of the ratchet wheel 314. A stop 504 may be implemented to prevent the electronic motor 502 from rotating the pawl 316 beyond the disengaged position 320. In at least one embodiment, the force of the electric motor 502 on the pawl 316 is greater than the force exertable by the inertial engagement mechanism 324 (not shown in FIG. 5) so that the actuator 120 can override the inertial engagement mechanism 324. When the signal 122 indicates the seatbelt is latched, the electric motor 502 ceases to drive the rotor and the rotor thus can be freely rotated, thereby permitting the inertial engagement mechanism 324 to move the pawl 316 between the engaged position 318 and the disengaged position 320 responsive to the inertial state of the inertia reel assembly 104.

Figure 6:
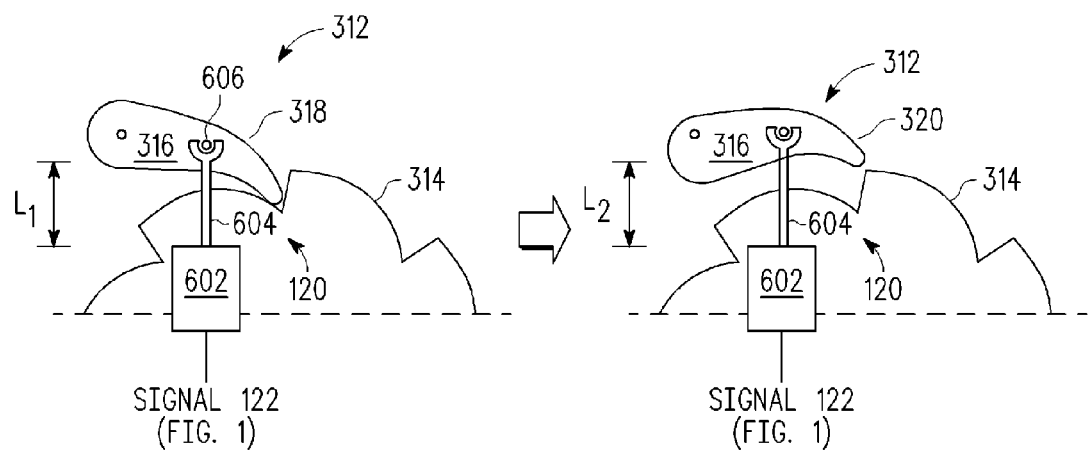
FIG. 6 is a diagram illustrating another example implementation of the actuator and the locking mechanism of the inertia reel assembly of FIG. 3 in accordance with at least one embodiment of the present disclosure.

FIG. 6 illustrates another example implementation of the actuator 120 with respect to the example locking mechanism 312 of FIG. 3 in accordance with at least one embodiment of the present disclosure. In the depicted example, the actuator 120 is implemented as a solenoid 602 having an extendable armature 604 that non-fixedly engages the pawl 316 (e.g., via a pin 606 fixed to the pawl 316). When the signal 122 indicates the seatbelt buckle 110 is latched, armature 604 of the solenoid 602 remains unextended (having length $L_1$), thereby permitting the inertial engagement mechanism 324 to move the pawl 316 between the engaged position 318 and the disengaged position 320 responsive to the inertial state of the inertia reel assembly 104. Conversely, when the signal 122 indicates the seatbelt buckle 110 is unlatched, the solenoid 602 extends the armature 604 to a length $L_2$ ($>L_1$), thereby moving the pawl 316 into the disengaged position 320 and maintaining the pawl 316 in the disengaged position 320 so as to prevent the pawl 316 from engaging the teeth of the ratchet wheel 314. In at least one embodiment, the force exerted by the solenoid 602 on the pawl 316 via the armature 604 is greater than the force exertable by the inertial engagement mechanism 324 (not shown in FIG. 6) so that the actuator 120 can override the inertial engagement mechanism 324 during an inertial event.

Figure 7:
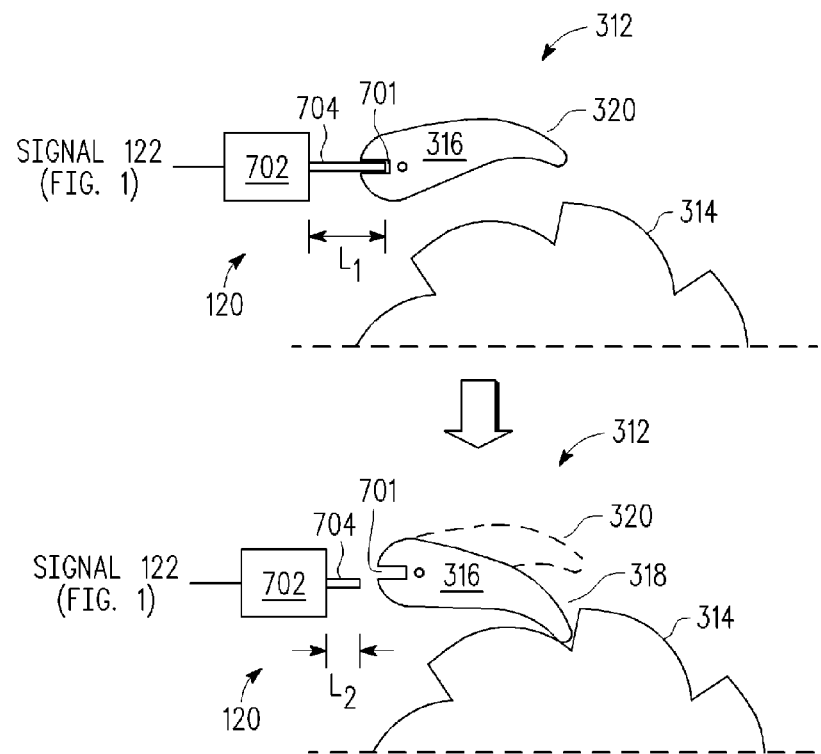
FIG. 7 is a diagram illustrating yet another example implementation of the actuator and the locking mechanism of the inertia reel assembly of FIG. 3 in accordance with at least one embodiment of the present disclosure.

FIG. 7 illustrates yet another example implementation of the actuator 120 with respect to the example locking mechanism 312 of FIG. 3 in accordance with at least one embodiment of the present disclosure. In the depicted example, the pawl 316 includes a notch 701 and the actuator 120 is implemented as a solenoid 702 having an extendable armature 704 that engages the notch 701 of pawl 316 when extended. When the signal 122 indicates the seatbelt buckle 110 is unlatched, the solenoid 702 extends the armature 704 to a length $L_1$ such that the armature 704 engages with the notch 701 while the pawl 316 is in the disengaged position 320, thereby maintaining the pawl 316 in the disengaged position 320 so as to prevent the pawl 316 from engaging the teeth of the ratchet wheel 314. When the signal 122 indicates the seatbelt buckle 110 is latched, the armature 704 of the solenoid 702 retracts to a length $L_2$ ($<L_1$) so as to disengage from the notch 701, thereby permitting the inertial engagement mechanism 324 (not shown in FIG. 7) to move the pawl 316 between the engaged position 318 and the disengaged position 320 responsive to the inertial state of the inertia reel assembly 104.

Although FIGS. 4-7 illustrate various example implementations of the locking mechanism 312 and the actuator 120, it will be appreciated that the locking mechanism 312 and the actuator 120 can be implemented in any of a variety of manners using the guidelines provided herein without departing from the scope of the present disclosure.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A vehicular restraint system comprising:
   a seatbelt assembly comprising:
      a seatbelt buckle;
      a latch assembly; and
      an inertia reel assembly having an unlocked configuration permitting rotation of a seatbelt reel in two directions and having a lockable configuration permitting rotation of the seatbelt reel in only one direction; and
   an actuator configured to manipulate the inertia reel assembly into the unlocked configuration in response to the seatbelt buckle being disengaged from the latch assembly and to manipulate the inertia reel assembly into the lockable configuration in response to the seatbelt buckle being engaged with the latch assembly.

2. The vehicular restraint system of claim 1, further comprising:
   a sensor configured to provide a first signal based on whether the seatbelt buckle is engaged with the latch assembly; and
   a hardware controller configured to selectively engage the actuator based on the first signal.

3. The vehicular restraint system of claim 2, wherein the sensor comprises one selected from a group consisting of: a capacitive sensor; a pressure sensor; a conductive sensor; and an optical sensor.

4. The vehicular restraint system of claim 2, wherein the hardware controller comprises a vehicle electronic control unit comprising an input to receive the first signal, an output to provide a second signal to the actuator, and hardware logic to configure the second signal based on the first signal.

5. The vehicular restraint system of claim 1, further comprising:
   a sensor configured to configure a first signal based on whether the seatbelt buckle is engaged with the latch assembly; and
   an amplifier having an input coupled to the sensor to receive the first signal and an output coupled to the actuator to provide a second signal, the second signal comprising an amplified representation of the first signal.

6. The vehicular restraint system of claim 1, wherein the inertia reel assembly comprises:
   a seatbelt reel;
   a ratchet wheel affixed to the seatbelt reel;
   a pawl configured to engage the ratchet wheel in a first position and disengage from the ratchet wheel in a second position; and
   wherein the actuator is configured to manipulate the pawl into the second position in response to the seatbelt buckle being disengaged from the latch assembly.

7. The vehicular restraint system of claim 6, wherein the actuator is configured to permit the pawl to be positionable in either the first position or the second position in response to the seatbelt buckle being engaged with the latch assembly.

8. The vehicular restraint system of claim 1, further comprising:
   a vehicle comprising the vehicular restraint system.

9. A vehicle comprising:
   a seatbelt assembly comprising:
      a seatbelt buckle;
      a latch assembly affixed to a body of the vehicle; and
      an inertia reel assembly having an unlocked configuration permitting rotation of a seatbelt reel in two directions and having a lockable configuration permitting rotation of the seatbelt reel in either two directions or only one direction based on an inertial state of the inertia reel assembly;
   means for manipulating the inertia reel assembly into the unlocked configuration in response to the seatbelt buckle being disengaged from the latch assembly; and
   means for manipulating the inertial reel assembly into the lockable configuration in response to the seatbelt buckle being engaged with the latch assembly.

10. The vehicle of claim 9, wherein the means for manipulating the inertia reel assembly into the unlocked position and the means for manipulating the inertia reel assembly into the locked position comprise:
    a sensor disposed at the latch assembly and configured to provide a signal representative of whether the seatbelt buckle is engaged with the latch assembly; and
    an actuator configured to manipulate the inertia reel assembly into one of the unlocked configuration or lockable configuration based on the signal.

11. The vehicle of claim 10, wherein the sensor comprises one selected from a group consisting of: a capacitive sensor; a pressure sensor; a conductive sensor; and an optical sensor.

12. The vehicle of claim 9, wherein the vehicle comprises one selected from a group consisting of: an automobile; a tractor trailer; a bus; an airplane; a train; and a ship.

13. A vehicular restraint system comprising:
    a seatbelt assembly comprising:
       a seatbelt buckle;
       a latch assembly; and
       an inertia reel assembly comprising:
          a seatbelt reel;
          a ratchet wheel affixed to the seatbelt reel; and
          a pawl configured to engage the ratchet wheel in a first position and disengage from the ratchet wheel in a second position; and
       an actuator configured to manipulate the pawl into the second position in response to the seatbelt buckle being disengaged from the latch assembly.

14. The vehicular restraint system of claim 13, wherein the actuator is configured to permit the pawl to be positionable in either the first position or the second position in response to the seatbelt buckle being engaged with the latch assembly.

15. The vehicular restraint system of claim 13, further comprising:
    a vehicle comprising the vehicular restraint system.

16. The vehicular restraint system of claim 15, wherein the vehicle comprises one selected from a group consisting of: an automobile; a tractor trailer; a bus; an airplane; a train; and a ship.

* * * * *